Figure 1:
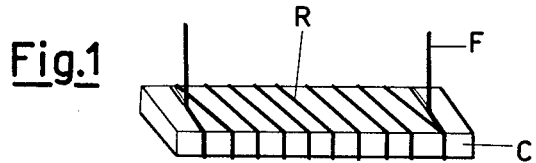

Sept. 25, 1962         G. CANEGALLO         3,055,084

METHOD OF MAKING COVERED ELECTRICAL RESISTORS

Filed Dec. 29, 1958                        3 Sheets-Sheet 1

Sept. 25, 1962          G. CANEGALLO          3,055,084
METHOD OF MAKING COVERED ELECTRICAL RESISTORS
Filed Dec. 29, 1958          3 Sheets-Sheet 2
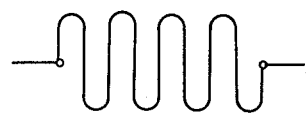
Fig.5
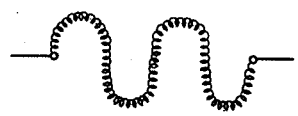
Fig.6
Fig.7
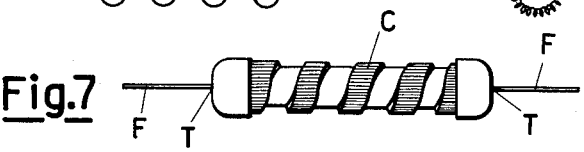
Fig.9
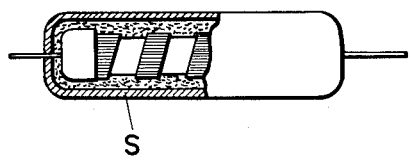
Fig.8
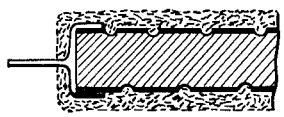
Fig.10
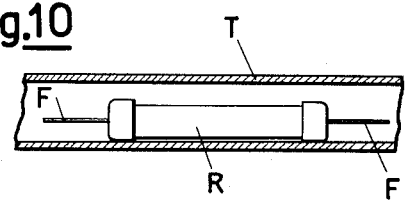
Fig.10a
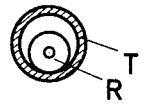
Fig.11
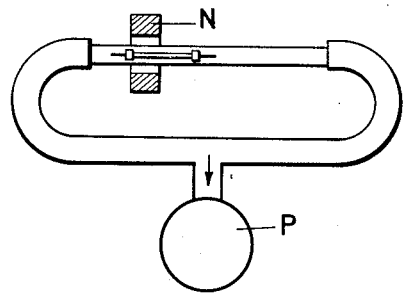

Sept. 25, 1962  G. CANEGALLO  3,055,084
METHOD OF MAKING COVERED ELECTRICAL RESISTORS
Filed Dec. 29, 1958  3 Sheets-Sheet 3

United States Patent Office 3,055,084
Patented Sept. 25, 1962

3,055,084
METHOD OF MAKING COVERED
ELECTRICAL RESISTORS
Giovanni Canegallo, Varese, Italy, assignor of one-half to S.E.C.I.-Societa Elettrotecnica Chimica Italiana S.p.A., Milan, Italy, an Italian company
Filed Dec. 29, 1958, Ser. No. 783,235
Claims priority, application Italy Mar. 7, 1958
1 Claim. (Cl. 29—155.63)

Existing so-called enamelled electric resistors are constituted as is well-known by supports of ceramic material generally having a tubular or flat shape around which there is helically wound up a wire of metal alloy such as nickel-chromium, constantan or the like, said wire being protected by coating it with a layer of inorganic enamel melted at high temperature.

The enamel is applied cold to the resistor by dipping, spraying, brushing a suspension of the enamel in the form of a fine powder suspended in various liquids such as water, turpentine or alcohol.

When the liquid has evaporated, the resistor is covered by a layer of powdery enamel, which thereafter is melted by subjecting said resistors within suitable kilns to temperatures of between 600 and 1000 degrees according to the characteristics of the enamel employed.

When following the procedure hereinabove described, or other similar conventional procedures, sufficient cementing and adhesion of the enamel granules with one another and to the surface of the support can be obtained only by baking the resistors at very high temperatures which are only a little lower than the temperature of liquefaction of the enamel employed, whence the metal wires embedded therein undergo considerable oxidation and chemical corrosion and often become broken thereby causing costly waste.

The operations of applying the enamel to the resistors and subsequent baking must generally be repeated two or more times successively because, if the layer of powdery enamel adhering to the resistor is too thick, it easily detaches irregularly during heating and results in defective units which have to be discarded, hence it is necessary to apply and bake successive thin layers of the enamel.

In accordance with the manufacturing process embodying the present invention, the enamel, glass, or other inorganic insulating materials encompassing and protecting the resistor, are subjected during the period of heating to simultaneous compression, that is, the insulating material is subjected to pressure while in the plastic state, so that it undergoes a process of sintering and not only of melting.

In a preferred embodiment of the invention, compression of the insulating shell is obtained by utilising the action of atmospheric pressure acting externally thereof.

With embodying this invention, manufacture becomes more rapid and cheaper because the resistors can be obtained in finished form with a single operation of contemporaneous baking and pressing, while conventional methods require two or more successive enamelling and baking operations, and higher temperatures.

In the accompanying drawings there are illustrated various possible embodiments of the invention.

Figure 2:
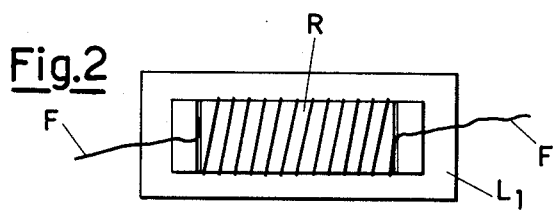
Figure 3:
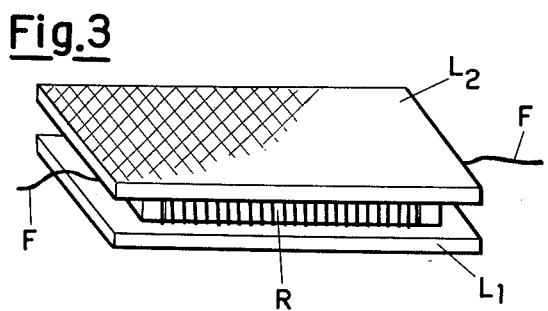
Figure 4:
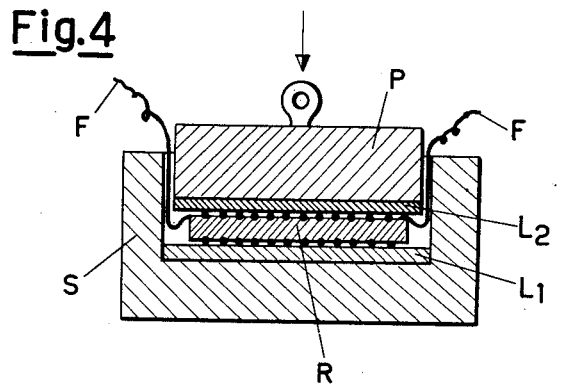
Figure 12:
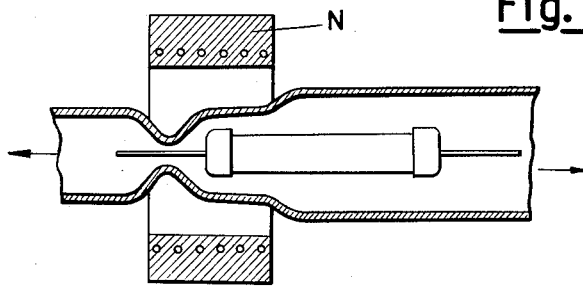
Figure 13:
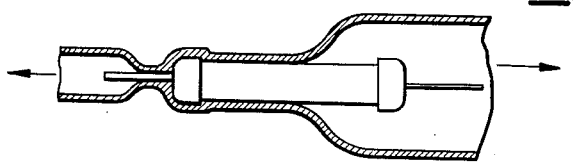
Figure 14:
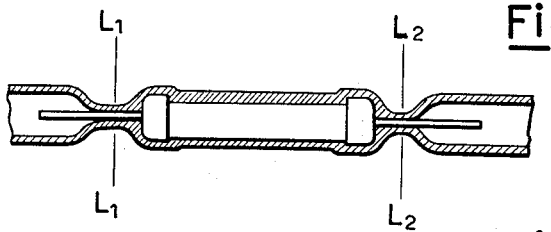
Figure 15:

FIG. 1 represents a resistor not yet protected;
FIG. 2 and FIG. 3 represent respectively in plan view and in perspective view the same resistor placed between two plates of enamel or glaze;
FIG. 4 represents the assembly of FIG. 3 introduced into a mould adapted to be introduced into a heating kiln;
FIG. 5 and FIG. 6 represent types of resistors without internal support;
FIG. 7 represents a resistor of the kind having a layer helically wound on a ceramic rod;
FIG. 8 represents the same resistor of FIG. 7 with a protective layer of insulating material applied on the outside;
FIG. 9 represents the same resistor, in section, after the contemporaneous baking and compressing thereof;
FIG. 10 and FIG. 10a represent in longitudinal section and in cross-section respectively a resistor introduced into a protective tube;
FIG. 11 represents the assembly of FIG. 10 ready to pass gradually through a heating kiln while the interior of the tube is simultaneously evacuated by means of a vacuum pump and
FIGURES 12, 13, 14, 15 represent the successive stages of the process as applied to the resistor of FIG. 11.

A second possible embodiment of the invention consists in manufacturing previously with the enamel or with the glaze, the plates, tubes or any other shape-containers adapted easily to embody with the various methods of technology of working of the glazes or ceramic materials.

The plates, tubes and containers are subsequently applied to the resistors of the various types by heating them and compressing them as said above. In the example represented diagrammatically in FIGURES 1 to 4, a resistor "R" constituted by a metal wire "F" wound around a ceramic support "C" of flat parallelepiped shape, is accommodated between two plates of enamel or glaze L1 and L2 of convenient thickness and of dimensions equal or by little different with respect to those of the said resistor and the whole is accommodated at the recessed bottom of a metallic mould "S." On the three pieces L1—R—L2 there is applied the metallic counter-mould or punch "P" which with its weight, if needed increased by a mechanical pressure applied thereto from the outside, compresses the three pieces one against the other one.

In placing the whole assembly into a kiln or at any rate if heating it adequately, as soon as the softening temperature of the enamel or of the glaze (of which the two plates L1 and L2 are made) is attained, said plates—under the action of the heat and of the mechanical pressure exerted by the punch "P"—deform plastically thereby filling all the cavities and welding to one another at their borders. With the action of mechanical pressure it becomes possible to obtain the plastic deformation and welding of the two plates L1 and L2 at a temperature sensibly lower than that which would have been necessary without the action of mechanical pressure.

After cooling the whole assembly it becomes possible to extract the resistor which appears to be practically finished in one single operation, except the cleaning and the elimination of any side burrs. Obviously the value of temperature, the duration of heating, the mechanical pressure and any other particulars, if any, of the process should be adapted for the kind, shape and size of the resistor and to the characteristics of the enamel and of the glaze employed and will have to be defined by experimental tests.

It is possible to embody the process also by preparing previously the first plate L1, by pressing cold or hot fine or granulated powder of enamel or glaze within the said metallic mould. On said plate the resistor is to be placed which then will be covered by a suitable thickness of enamel or glaze in fine or granular powder which in turn will be compressed by means of the punch "P" before or during the heating of the whole assembly.

If using—in lieu of the two plates—a tube of circular or flat cross-section previously made with enamel or glaze, the process remains substantially the same, that is to say, one introduces the resistor into the tube and after having placed the whole into the mould, the latter is closed with the punch "P." Thereafter, the assembly is conveniently heated until obtaining the plastic deformation of the tube by applying if needed also a mechanical pressure on the punch "P" if its weight alone should not be sufficient.

Obviously the chemical, mechanical and electric characteristics of the materials used for covering and protecting the resistors must be suited for the purpose.

The coefficient of heat expansion of the enamel or glaze and that of the material constituting the support whereon the metal wire is wound up or whereon the conductive layer is spread, should be equal to each other or by little different from each other.

The support whereon the metal wire is wound up, may be of mica, cardboard or asbestos fabric, or of textile glass or even made with the same material as employed for the coating, that is to say, of enamel or glaze, pure or mixed with possible other adapted inorganic materials.

The enamel or glaze used to carry out the insulating coating may be pure or mixed homogeneously in various proportions with other powdery or granulated inorganic materials such as silica, magnesium oxide, and even with metallic powders, in order to increase the heat conductivity of said glaze and enamel.

With the process described of course it is possible to make resistors of shape and size even very different from those indicated and this is obtained by using moulds and punches of adequate shapes.

If on the internal surface of the mould or punch there are engraved in bas-relief or built-up high-relief inscriptions or signs, these obviously will result in being reproduced respectively in high-relief or in bas-relief on the external surface of the resistors.

The flexible resistors constituted by metallic wires wound up by simple or double helix on cores of asbestos or textile glass, or constituted by ribbons woven with fibers of textile glass and in which the chain or warp is made with threads or with helices of metal wire, are very well suited for being protected by glaze or enamel according to the process set forth herein.

With the method described it is also possible to provide resistors with enamel or glaze without using supports for the coil of metallic conductor. In this case the metallic conductor constituting the resistor proper, can be accommodated between the two plates of enamel or of glass, bent in fret shape (meander shape) or as flat helix or in any other way, as for instance that reported in FIG. 5.

In FIG. 6 there is indicated the embodiment of the same resistor of FIG. 5 but in which the metallic conductor, before being bent in fret (meander) shape, has been wound up helically on a rigid core which then has been extracted or somehow taken off the interior of said helix.

In the same hood of enamel or glaze there may be accommodated by submerging two or more resistors electrically connected or not with one another.

With the process of manufacture hereinabove set forth in accordance with the present invention, it becomes possible, moreover, to protect with enamels or inorganic glazes also resistors which are not of metal wire, such as for instance resistors with graphite layers, with metal layers, or with metal oxide layers, as well as so-called mix-resistors, made with powders of inorganic insulating materials such as kaolin, clay, glaze, various silicates, mixed with powders of electrically conductive materials such as metals, graphite, lamp black, metal oxides, etc. pressed, baked or sinterised.

If the materials constituting the resistance, namely the metals or metal alloys, the metal oxides, the graphite or lamp black, or the like are too much affected by oxidation at the softening temperature of the enamel or glaze employed, the baking and moulding of the pieces may be carried out in special closed vessels from which, either before or during the heating, the air is extracted, or is replaced by an inert gas, such as, nitrogen or the like.

If it is desired to avoid direct contact of the protective enamel or glaze with the metal wire or with the conductive layer constituting the resistance, the present invention provides for the application on said conductor or on the whole resistor, of a layer having a thickness between 0.05 and 2 mm. and formed of inorganic materials which are electrically insulating, such as silica, magnesium oxide, kaolin, asbestos and the like.

These materials are reduced to fine powders and kept in suspension in a liquid, such as water or turpentine, which may contain a small percentage of gluing substances, such as gum arabic, natural or synthetic resins or the like.

This liquid suspension is applied on the resistor by the known methods used with paints, such as, dipping, spraying or brushing. After evaporation of the liquid, the organic substances are eliminated by oxidation or decomposition by heating the pieces to suitable temperatures, before or even during the process of manufacture above described, while the granules of the inorganic substances will remain adherent to the surface of the resistor.

By way of example, in FIG. 7 there is diagrammatically represented a resistor of the conventional kind with a layer of graphite, metal or a metal oxide, deposited in a helical groove engraved in the surface of a rod of ceramic material, whereby there is obtained a considerable increase in the length of the conductor "C" which appears in that way to be wound helically around the ceramic rod.

At "T" are indicated the metallic caps with the respective metallic wires "F" constituting the terminals of the resistor. In FIG. 8 there is illustrated in section the same resistor on whose surface there has been applied a protective layer of insulating powdery inorganic material "P." In FIG. 9 there is diagrammatically illustrated the same resistor of the kind having a conductive layer protected with an outer shell or coating of enamel or glaze "S" obtained by the process now to be described.

When employing a tube of glaze or enamel within which there is accommodated a resistor of any kind, for example, a resistor with a wire coil, a resistance layer or any other kind, it becomes possible to provide a protective outer coating or shell without using any moulds or dies, in the following way:

The resistor "R" is introduced into the tube "T," complete with its respective metallic terminals "F" as indicated in FIG. 10 and in FIG. 10a.

The two ends of the glaze tube "T," which should be longer than the body of the resistor "R," are connected by means of two flexible tubes with a vacuum pump "P" which extracts the air and maintains inside the tube a pressure considerably lower than the outside atmospheric pressure.

The tube "T" with the resistor "R" therein is heated up to its softening temperature by introducing it progressively into the small annular kiln "N." As the glaze tube is heated and softens, the external atmospheric pressure plastically deforms the wall of the tube until the latter closely adheres to the surface of the resistor.

By suitably regulating the temperature of the small kiln and of the speed of relative displacement between the small kiln "N" and the tube, it is possible to obtain the desired degree of softening of the glass or enamel making up the tube. If the terminals "F" of the resistor are made of suitable metal, it is possible to obtain a hermetic joint with the insulating shell which is vacuum-sealed and in that case the resistor is perfectly protected from the influence of external agents.

When the above operation has been completed, the tube of insulating material is cut-away at the two points L1 and L2, and the two non-deformed tube sections are removed (FIG. 15), whereupon, the resistor appears in finished form with its two terminals "F" issuing from the insulating shell or hood.

The method of manufacture set forth hereinabove is very well suited for resistors of the kind having a graphite layer or made of materials which are very easily oxidised, since oxidation of said materials is avoided by the vacuum created within tube "T" during the deforming of the latter about the resistor. Moreover by applying to the resistor the protective layer of inert materials, as illustrated in FIGS. 8 and 9, it becomes possible to avoid direct contact between the enamel or the glaze constituting the external hood or shell and the easily oxidizable resistance element or layer.

The resistors manufactured according to the present invention are distinguished over others made by conventional methods, and in which direct contact between the protective layer and the conductor for the electric current is avoided, in that, in accordance with this invention, the insulating protective hood or shell constituted by enamel or glaze or by sintered ceramic materials, is in direct contact with the conductive material constituting the resistance, whence the value of the coefficient of heat transfer is very high. Even if the resistor is further protected by a thin layer of inert, powdery materials, as in FIGS. 8 and 9, the value of the heat transfer coefficient between the resistor and the protective external insulating hood or shell always is very high owing to the relatively large contact surface between the conductor for the electric current and the protective insulating hood, and owing to the fact that heat transfer towards the outside takes place by conduction through solid substances.

I claim:

A process for applying an insulating cover to an electric resistor having an elongated support element with electric resistance means thereon, comprising the steps of applying to said support element with the electric resistance means thereon a layer of powdered inorganic insulating material with a bonding agent having a volatile constituent, introducing the resistor with said layer thereon into a hollow tube of vitreous insulating material which is deformable under heat and pressure, connecting the interior of said tube to a vacuum source and simultaneously heating said tube so that said volatile constituent of the bonding agent is evaporated and evacuated from the tube by the combined action of the heat and vacuum while the tube is softened and atmospheric pressure acting externally on the evacuated tube deforms the softened tube against the resistor to form a closely adherent insulating coating on the latter which is spaced from said resistance means by said layer.

References Cited in the file of this patent

UNITED STATES PATENTS

| 845,413 | Haagn | Feb. 26, 1907 |
|---|---|---|
| 2,092,133 | Neumann | Sept. 7, 1937 |
| 2,163,798 | Mucher | June 27, 1939 |
| 2,469,569 | Ohl | May 10, 1949 |
| 2,490,611 | Backer | Dec. 6, 1949 |
| 2,557,571 | Siegel | June 19, 1951 |
| 2,622,779 | Smith | Dec. 23, 1952 |
| 2,623,145 | Upton | Dec. 23, 1952 |
| 2,893,182 | Pies | July 7, 1959 |

FOREIGN PATENTS

| 253,165 | Great Britain | June 10, 1926 |